US012325112B2

(12) United States Patent
Dales et al.

(10) Patent No.: US 12,325,112 B2
(45) Date of Patent: Jun. 10, 2025

(54) POWER TOOL WITH IMPULSE ASSEMBLY INCLUDING A VALVE

(71) Applicant: MILWAUKEE ELECTRIC TOOL CORPORATION, Brookfield, WI (US)

(72) Inventors: Hugh A. Dales, Germantown, WI (US); Michael A. Verhagen, Nashotah, WI (US); Troy C. Thorson, Cedarburg, WI (US); Jacob R. Seifert, Lake Mills, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 7 days.

(21) Appl. No.: 18/364,780

(22) Filed: Aug. 3, 2023

(65) Prior Publication Data

US 2023/0373067 A1 Nov. 23, 2023

Related U.S. Application Data

(63) Continuation-in-part of application No. 17/487,451, filed on Sep. 28, 2021, now Pat. No. 11,724,368.

(Continued)

(51) Int. Cl.
*B25B 21/02* (2006.01)
*B25B 23/145* (2006.01)

(52) U.S. Cl.
CPC ........ *B25B 21/026* (2013.01); *B25B 23/1453* (2013.01)

(58) Field of Classification Search
CPC .......................... B25B 21/026; B25B 23/1453
See application file for complete search history.

(56) References Cited

U.S. PATENT DOCUMENTS 2,293,786 A * 8/1942 Worden .................. B25B 23/14 81/475
2,293,787 A * 8/1942 Worden .................. B25B 23/14 81/475

(Continued)

FOREIGN PATENT DOCUMENTS

DE 102017119623 A1 2/2019
EP 0631851 A1 1/1995

(Continued)

OTHER PUBLICATIONS

International Search Report and Written Opinion for Application No. PCT/US2021/052345 dated Jan. 21, 2022 (12 pages).

(Continued)

*Primary Examiner* — Thomas M Wittenschlaeger
*Assistant Examiner* — David G Shutty
(74) *Attorney, Agent, or Firm* — Michael Best & Friedrich LLP

(57) ABSTRACT

A power tool includes a housing, a motor positioned within the housing, an impulse assembly coupled to the motor to receive torque therefrom, the impulse assembly including a cylinder at least partially forming a chamber containing a hydraulic fluid, an anvil positioned at least partially within the chamber, and a hammer positioned at least partially within the chamber and engageable with the anvil for transferring rotational impacts to the anvil, the hammer including a through hole, and a valve configured to control flow of the hydraulic fluid through the through hole.

17 Claims, 11 Drawing Sheets

Related U.S. Application Data

(60) Provisional application No. 63/084,074, filed on Sep. 28, 2020.

(56) References Cited

U.S. PATENT DOCUMENTS

| | | | | | |
|---|---|---|---|---|---|
| 2,476,632 | A | * | 7/1949 | Shaff | B25B 21/02 477/177 |
| 2,720,956 | A | | 10/1955 | Coombes | |
| 2,821,276 | A | | 1/1958 | Reynolds | |
| 2,973,071 | A | | 2/1961 | Sturrock | |
| 3,068,973 | A | | 12/1962 | Mauer | |
| 3,104,743 | A | | 9/1963 | Reynolds | |
| 3,181,672 | A | | 5/1965 | Swanson | |
| 3,319,723 | A | | 5/1967 | Kramer | |
| 3,581,831 | A | | 6/1971 | Biek | |
| 3,622,062 | A | | 11/1971 | Goode, Jr. et al. | |
| 3,835,934 | A | | 9/1974 | Schoeps et al. | |
| 3,908,373 | A | | 9/1975 | Peterson | |
| 4,316,512 | A | | 2/1982 | Kibblewhite et al. | |
| 4,418,590 | A | | 12/1983 | Dubiel et al. | |
| 4,635,731 | A | | 1/1987 | Wallace et al. | |
| 4,669,553 | A | | 6/1987 | Hukase | |
| 4,683,961 | A | * | 8/1987 | Schoeps | B25B 23/1453 464/25 |
| 4,735,595 | A | * | 4/1988 | Schoeps | B25B 21/026 464/25 |
| 5,092,410 | A | * | 3/1992 | Wallace | B25B 21/02 81/463 |
| 5,117,919 | A | | 6/1992 | Borries et al. | |
| 5,172,774 | A | | 12/1992 | Melrose | |
| 5,607,023 | A | | 3/1997 | Palm | |
| 5,720,423 | A | | 2/1998 | Kondo | |
| 5,897,454 | A | | 4/1999 | Cannaliato | |
| 6,110,045 | A | * | 8/2000 | Schoeps | B25B 21/02 464/25 |
| 6,311,786 | B1 | | 11/2001 | Giardino et al. | |
| 6,536,536 | B1 | | 3/2003 | Gass et al. | |
| 6,655,570 | B2 | | 12/2003 | Shkolnikov et al. | |
| 6,782,956 | B1 | * | 8/2004 | Seith | B25B 21/026 173/206 |
| 6,863,134 | B2 | * | 3/2005 | Seith | B25B 21/02 173/205 |
| 8,316,958 | B2 | | 11/2012 | Schell et al. | |
| 9,259,826 | B2 | * | 2/2016 | Söderlund | B25B 21/02 |
| 9,352,456 | B2 | | 5/2016 | Murthy et al. | |
| 9,597,784 | B2 | | 3/2017 | Mcclung | |
| 10,508,495 | B2 | | 12/2019 | Swinford | |
| 11,426,853 | B2 | * | 8/2022 | Kawai | B25D 17/20 |
| 11,975,425 | B2 | * | 5/2024 | Sjösten | B25B 21/026 |
| 2001/0027871 | A1 | | 10/2001 | Tokunaga | |
| 2003/0009262 | A1 | | 1/2003 | Louis, III et al. | |
| 2003/0098167 | A1 | | 5/2003 | Giardino | |
| 2005/0199404 | A1 | | 9/2005 | Furuta et al. | |
| 2005/0247750 | A1 | | 11/2005 | Burkholder et al. | |
| 2007/0151740 | A1 | | 7/2007 | Friberg et al. | |
| 2009/0008117 | A1 | * | 1/2009 | Kettner | B25B 21/02 173/218 |
| 2009/0056966 | A1 | | 3/2009 | Grand et al. | |
| 2010/0139432 | A1 | | 6/2010 | Steckel et al. | |
| 2013/0047408 | A1 | | 2/2013 | Kibblewhite | |
| 2013/0105189 | A1 | | 5/2013 | Murthy et al. | |
| 2013/0270319 | A1 | | 10/2013 | Gauger et al. | |
| 2013/0313925 | A1 | | 11/2013 | Mergener et al. | |
| 2014/0011621 | A1 | | 1/2014 | Steckel et al. | |
| 2014/0124230 | A1 | | 5/2014 | Johnson et al. | |
| 2014/0166326 | A1 | | 6/2014 | Le Du et al. | |
| 2014/0202724 | A1 | | 7/2014 | Moore et al. | |
| 2014/0262396 | A1 | | 9/2014 | McClung | |
| 2014/0360744 | A1 | | 12/2014 | Lawrence | |
| 2014/0361645 | A1 | | 12/2014 | Beyerl | |
| 2015/0102084 | A1 | | 4/2015 | Zhao | |
| 2016/0158819 | A1 | | 6/2016 | Johnson | |
| 2016/0311094 | A1 | | 10/2016 | Mergener et al. | |
| 2016/0318165 | A1 | | 11/2016 | Thorson et al. | |
| 2016/0336838 | A1 | | 11/2016 | Kouda et al. | |
| 2017/0001289 | A1 | | 1/2017 | Soderlund | |
| 2017/0173768 | A1 | | 6/2017 | Dey, IV et al. | |
| 2017/0190028 | A1 | | 7/2017 | Howard et al. | |
| 2017/0190041 | A1 | | 7/2017 | Dey, IV et al. | |
| 2017/0246732 | A1 | | 8/2017 | Dey, IV et al. | |
| 2017/0259412 | A1 | | 9/2017 | Nishikawa et al. | |
| 2018/0236646 | A1 | | 8/2018 | Raggl et al. | |
| 2019/0022842 | A1 | | 1/2019 | Oouchi | |
| 2019/0030696 | A1 | | 1/2019 | Seith et al. | |
| 2019/0047133 | A1 | | 2/2019 | Beckert et al. | |
| 2019/0134795 | A1 | | 5/2019 | Bauer | |
| 2019/0168366 | A1 | | 6/2019 | Yasutomi et al. | |
| 2019/0224832 | A1 | | 7/2019 | Watanabe et al. | |
| 2019/0232469 | A1 | * | 8/2019 | Carlson | B25B 21/026 |
| 2020/0023501 | A1 | | 1/2020 | Bandy et al. | |
| 2020/0061786 | A1 | | 2/2020 | Zhang | |
| 2020/0215668 | A1 | | 7/2020 | Duncan et al. | |
| 2020/0347842 | A1 | * | 11/2020 | Lee | F04B 39/0005 |
| 2022/0097215 | A1 | | 3/2022 | Dales et al. | |
| 2023/0191567 | A1 | | 6/2023 | Opsitos, Jr. et al. | |
| 2023/0373067 | A1 | * | 11/2023 | Dales | B25B 21/026 |

FOREIGN PATENT DOCUMENTS

| | | | | |
|---|---|---|---|---|
| EP | 1454715 | B1 | | 8/2009 |
| JP | 2006255823 | A | | 9/2006 |
| JP | 2011125994 | A | | 6/2011 |
| JP | 2012076165 | A | | 4/2012 |
| JP | 5621980 | B2 | | 11/2014 |
| JP | 2015188953 | A | * | 11/2015 |
| WO | 9600139 | A1 | | 1/1996 |
| WO | 2012002578 | A1 | | 1/2012 |
| WO | 2012134474 | A1 | | 10/2012 |
| WO | 2015092033 | A1 | | 6/2015 |
| WO | 2018062609 | A1 | | 4/2018 |

OTHER PUBLICATIONS

Crown Oil, "Hydraulic Oil Explained—An Easy Guide," available at <https://www.crownoil.co.uk/guides/hydraulic-oil-guide> web page visited Nov. 29, 2022 (17 pages).

* cited by examiner

POWER TOOL WITH IMPULSE ASSEMBLY INCLUDING A VALVE

CROSS-REFERENCE TO RELATED APPLICATIONS

This application is a continuation-in-part of U.S. patent application Ser. No. 17/487,451, filed Sep. 28, 2021, now U.S. Pat. No. 11,724,368, which claims priority to U.S. Provisional Patent Application No. 63/084,074, filed Sep. 28, 2020, the entire contents of both of which are incorporated herein by reference.

FIELD

The present invention relates to power tools, and more particularly to hydraulic impulse power tools.

BACKGROUND

Impulse power tools are capable of delivering rotational impacts to a workpiece at high speeds by storing energy in a rotating mass and transmitting it to an output shaft. Such impulse power tools generally have an output shaft, which may or may not be capable of holding a tool bit or engaging a socket. Impulse tools generally utilize the percussive transfers of high momentum, which is transmitted through the output shaft using a variety of technologies, such as electric, oil-pulse, mechanical-pulse, or any suitable combination thereof.

SUMMARY

The present disclosure provides, in one aspect, a power tool including a housing, a motor positioned within the housing, an impulse assembly coupled to the motor to receive torque therefrom, the impulse assembly including a cylinder at least partially forming a chamber containing a hydraulic fluid, an anvil positioned at least partially within the chamber, and a hammer positioned at least partially within the chamber and engageable with the anvil for transferring rotational impacts to the anvil, the hammer including a through hole, and a valve configured to control flow of the hydraulic fluid through the through hole.

The present disclosure provides, in another aspect, a power tool including a housing, a motor positioned within the housing, an impulse assembly coupled to the motor to receive torque therefrom, the impulse assembly including a chamber containing a hydraulic fluid and a hammer configured to reciprocate within the chamber, the hammer including a through hole, and a valve configured to control flow of the hydraulic fluid through the through hole.

The present disclosure provides, in another aspect, a power tool including a housing, a motor positioned within the housing, an impulse assembly coupled to the motor to receive torque therefrom, the impulse assembly including a cylinder at least partially forming a chamber containing a hydraulic fluid, an expansion piece coupled to the cylinder, the expansion piece defining an expansion chamber and a passageway fluidly communicating the chamber and the expansion chamber, a plug received within the expansion chamber, the plug movable to vary a volume of the expansion chamber, an anvil positioned at least partially within the chamber, and a hammer positioned at least partially within the chamber and engageable with the anvil for transferring rotational impacts to the anvil.

Other aspects of the disclosure will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
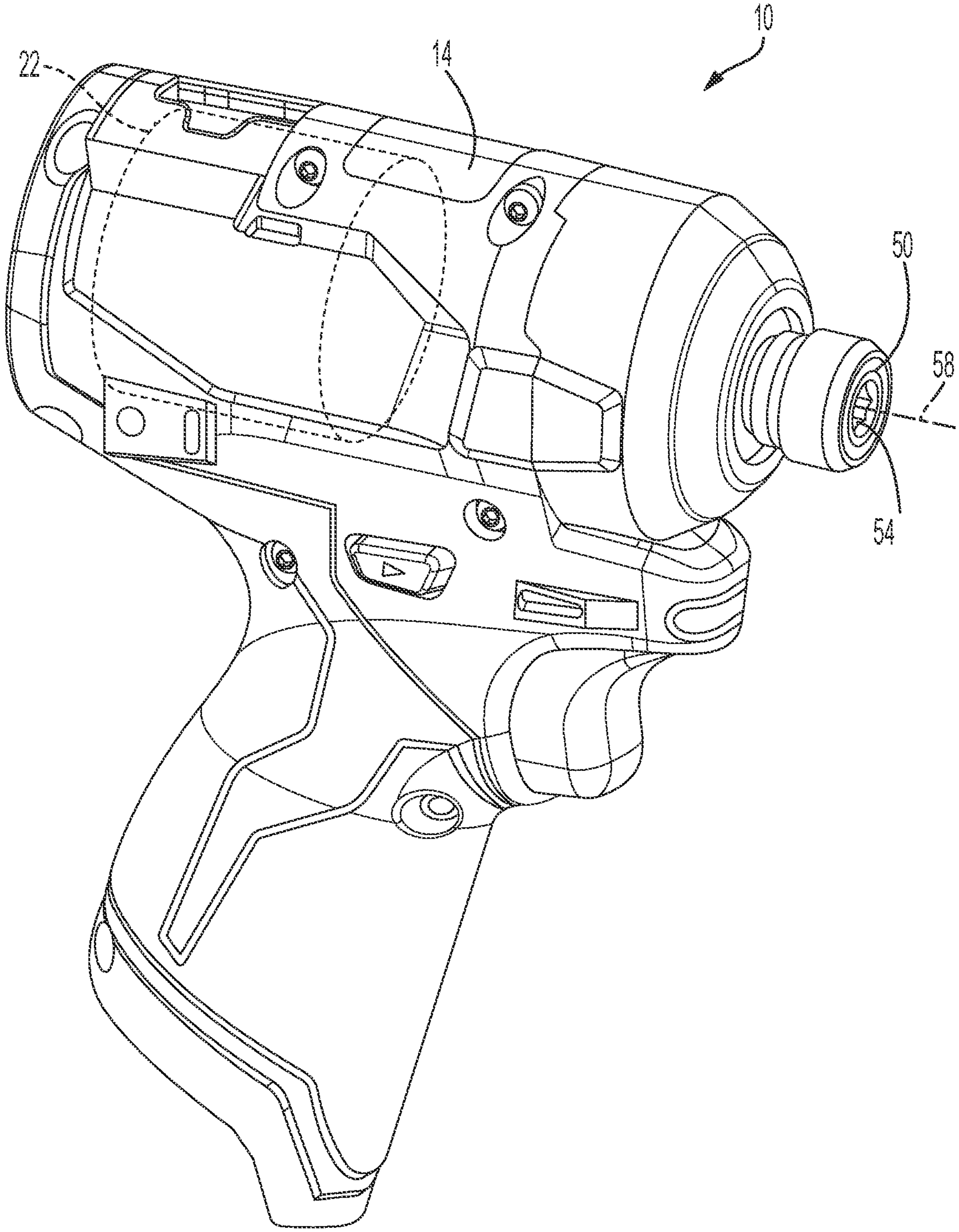
FIG. 1 is a front perspective view of an impulse power tool, according to some embodiments.

With reference to FIG. 1, an impulse power tool (e.g., an impulse driver 10) is shown. The impulse driver 10 includes a main housing 14 and a rotational impulse assembly 18 (see FIG. 2) positioned within the main housing 14. The impulse driver 10 also includes an electric motor 22 (e.g., a brushless direct current motor) coupled to the impulse assembly 18 to provide torque thereto and positioned within the main housing 14, and a transmission (e.g., a single or multi-stage planetary transmission) positioned between the motor 22 and the impulse assembly 18. In some embodiments, the impulse driver 10 is battery-powered and is configured to be powered by a battery with a voltage less than 18 volts. In other embodiments, the impulse driver 10 is configured to be powered by a battery with a voltage below 12.5 volts. In another embodiment, the tool is configured to be powered by a battery with a voltage below 12 volts.

Figure 2:
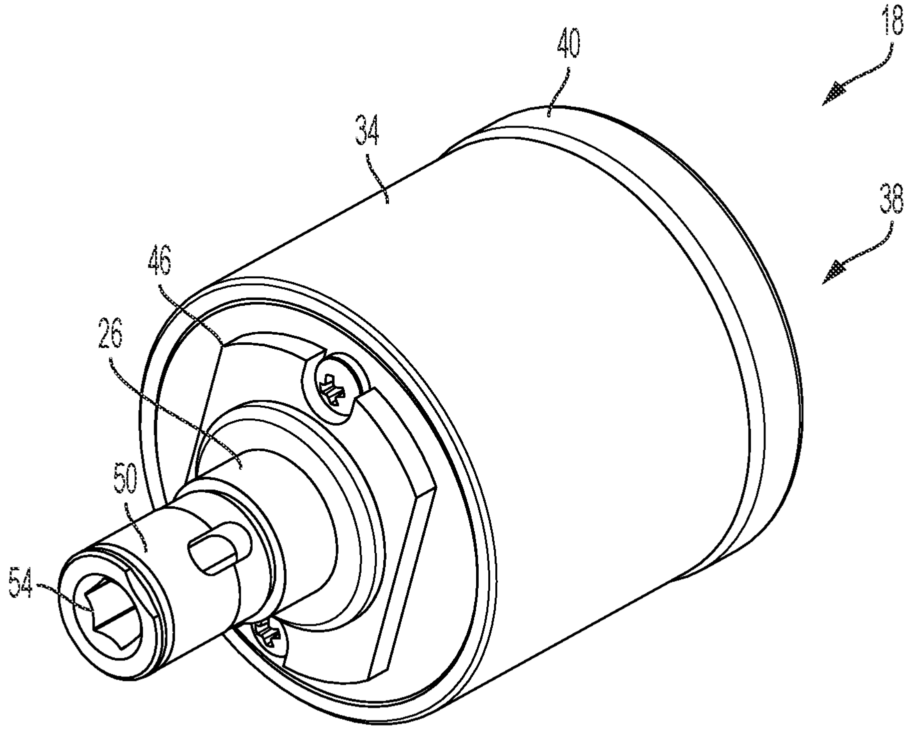
FIG. 2 is a perspective view of an impulse assembly, according to some embodiments.
Figure 3:
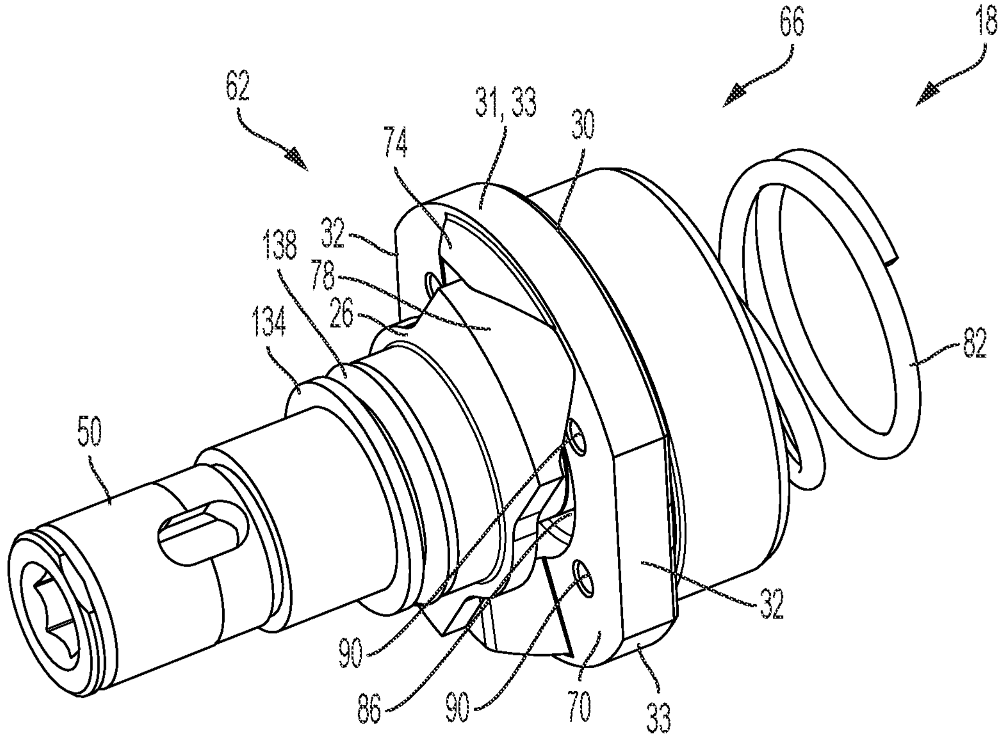
FIG. 3 is a perspective view of the impulse assembly of FIG. 2, with some portions removed for clarity.

With reference to FIGS. 2 and 3, the impulse assembly 18 includes an anvil 26, a hammer 30, and a cylinder 34. A driven end 38 of the cylinder 34 is coupled to the electric motor 22 to receive torque therefrom, causing the cylinder 34 to rotate. A bearing 40 is coupled to the driven end 38 of the cylinder 34. The cylinder 34 at least partially defines a chamber 42 (FIG. 6A) that contains an incompressible fluid (e.g., hydraulic fluid, oil, etc.). The chamber 42 is sealed and is also partially defined by an end cap 46 secured to the cylinder 34. The hydraulic fluid in the chamber 42 reduces the wear and the noise of the impulse assembly 18 that is created by impacting the hammer 30 and the anvil 26.

Figure 6A:
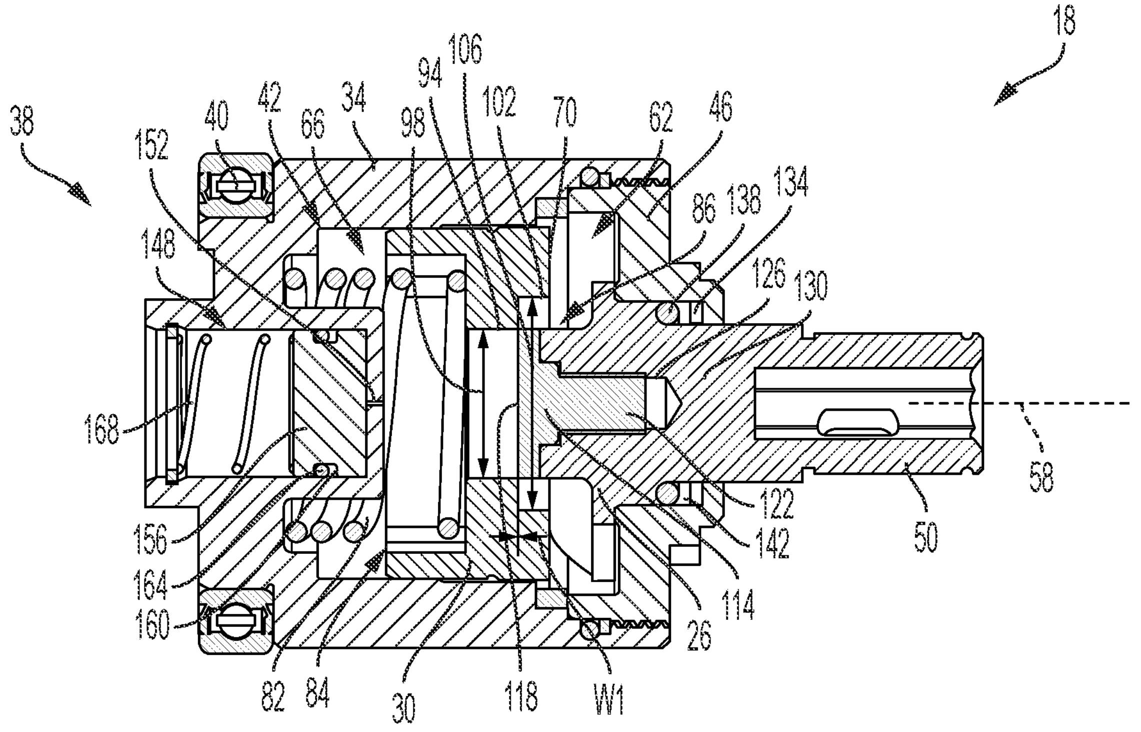
FIG. 6A is a cross-sectional view of the impulse assembly of FIG. 2, shown in a first configuration with an aperture in the hammer closed.

With reference to FIGS. 3 and 6A, the anvil 26 is positioned at least partially within the chamber 42 and includes an output shaft 50 with a hexagonal receptacle 54 therein for receipt of a tool bit. The output shaft 50 extends from the chamber 42 and through the end cap 46. The anvil 26 rotates about a rotational axis 58 defined by the output shaft 50.

With reference to FIGS. 3-6A, the hammer 30 is positioned at least partially within the chamber 42. The hammer 30 includes a first side 62 facing the anvil 26 and a second side 66 opposite the first side 62. On the first side 62, the hammer 30 includes a surface 70 facing the anvil 26. The hammer 30 further includes hammer lugs 74 extending from the surface 70. The hammer lugs 74 correspond to anvil lugs 78 formed on the anvil 26. The hammer lugs 74 are engageable with the anvil lugs 78 for transferring rotational impacts from the hammer 30 to the anvil 26.

Figure 4:
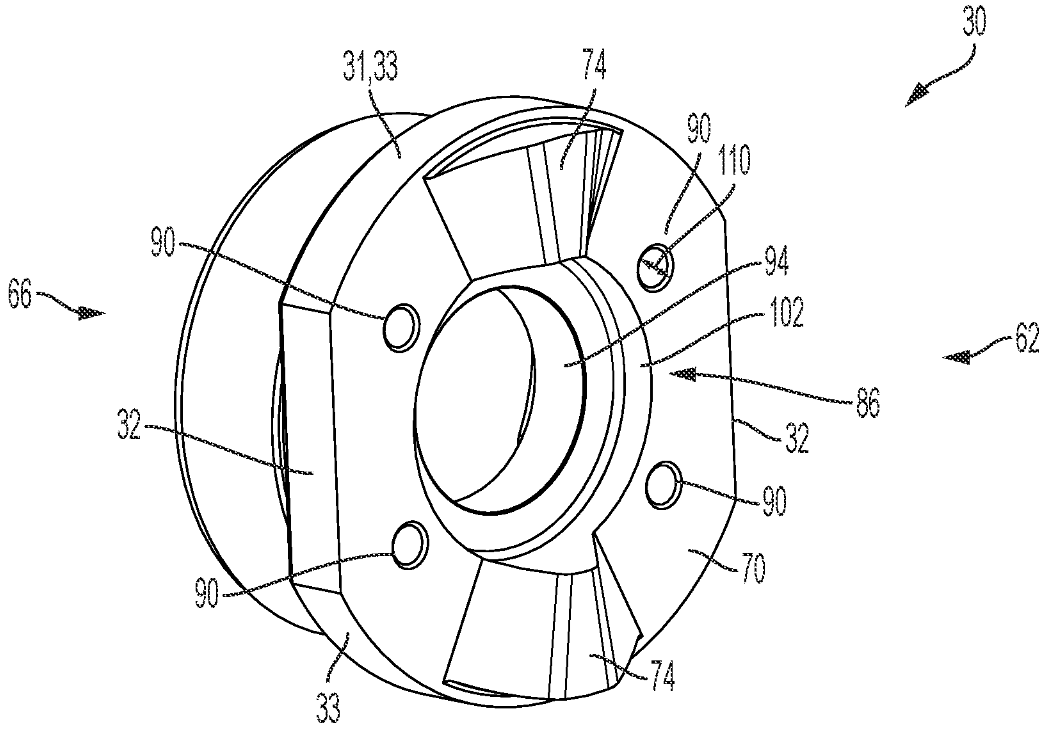
FIG. 4 is a perspective view of a hammer of the impulse assembly of FIG. 2.
Figure 5:
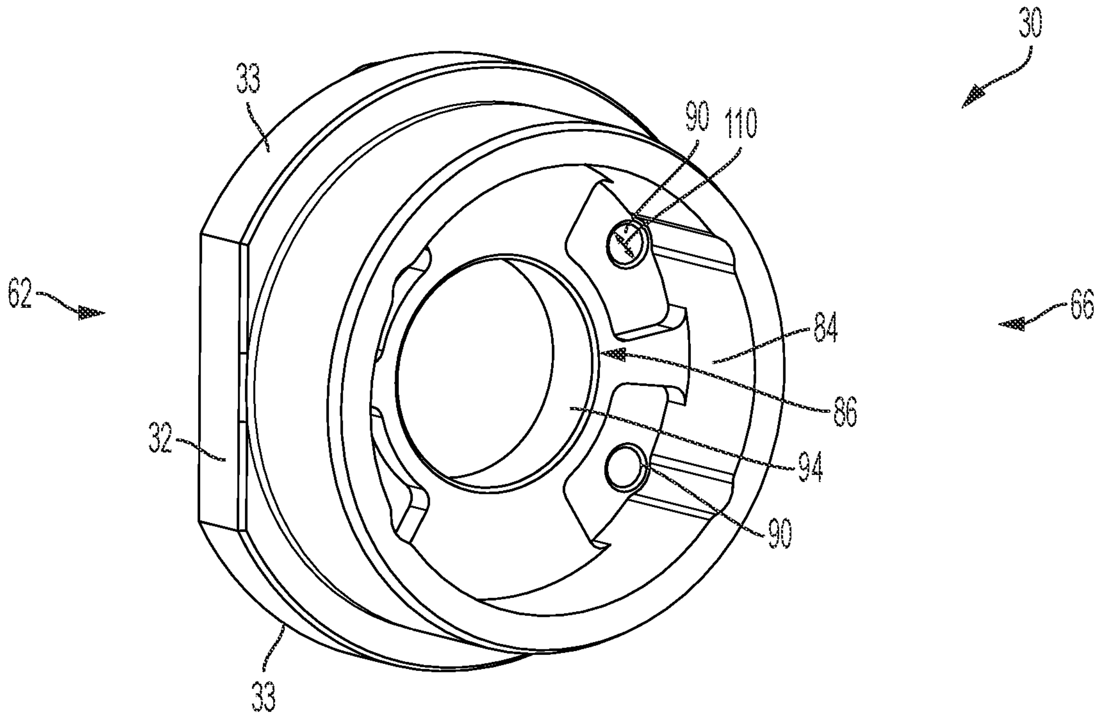
FIG. 5 is another perspective view of the hammer of FIG. 4.

With reference to FIGS. 4 and 5, the cylinder 34 and the hammer 30 utilize corresponding double-D shapes to rotationally unitize the cylinder 34 and the hammer 30. The double-D shape eliminates the need to utilize additional components (e.g., hammer alignment pins) to rotationally unitize the hammer 30 and the cylinder 34, while still allowing the hammer 30 to slide axially with respect to the cylinder 34. The hammer 30 includes an outer circumferential surface 31 that is double-D shaped and corresponding to a profile in the interior of the cylinder 34. In other words, the outer circumferential surface 31 includes two planar portions 32 connected by two arcuate portions 33. A hammer spring 82 (i.e., a first biasing member) is positioned within the chamber 42 and biases the hammer 30 toward the anvil 26. In particular, the hammer spring 82 is positioned between the hammer 30 and the cylinder 34. In the illustrated embodiment, the hammer spring 82 is at least partially received within a recess 84 formed on the second side 66 of the hammer 30.

With reference to FIGS. 4 and 5, a first through hole 86 is formed in the surface 70 and extends between sides 62, 66. In the illustrated embodiment, the first through hole 86 is centered on the surface 70 and aligned with the axis 58. The hammer 30 further includes a plurality of secondary through holes 90 formed in the surface 70 and extending between sides 62, 66. The secondary through holes 90 are positioned radially outward from the first through hole 86. In the illustrated embodiment, there are four secondary through holes 90 positioned around the first through hole 86. In other embodiments, more or fewer of the secondary through holes 90 may be provided. As discussed in greater detail below, the through holes 86, 90 permit the hydraulic fluid in the chamber 42 to pass through the hammer 30.

With continued reference to FIGS. 4-6C, the first through hole 86 has a first portion 94 with a first diameter 98 and a second portion 102 with a second diameter 106 larger than the first diameter 98. The first portion 94 and the second portion 102 of the first through hole 86 are coaxially aligned with the axis 58. The second portion 102 faces the anvil 26 and is closer to the anvil 26 than the first portion 94. In other words, the first through hole 86 is a stepped-diameter hole with the larger diameter portion 102 facing the anvil 26. With reference to FIG. 6A, the anvil 26 is at least partially received within the first through hole 86. As such, the anvil 26 at least partially blocks hydraulic fluid from flowing through the first through hole 86. The secondary through holes 90 have a constant diameter 110 throughout their axial length. In other words, the secondary through holes 90 are formed as cylindrical bores between sides 62, 66.

With reference to FIG. 6A, the anvil 26 includes a removable and interchangeable plug 114. The plug 114 includes an end surface 118 facing the hammer 30 and a stem 122 received within a bore 126 formed in a shaft portion 130 of the anvil 26. The plug 114 is one of a plurality of plugs that may be selected for installation to the shaft portion 130. The size and shape of the plug 114 is varied to change an operating characteristic of the impulse tool 10 (e.g., to suit a desired torque profile). For example, the overall axial length of the plug may vary when comparing two possible plugs for installation in the shaft portion 130. In other words, the plug 114 can be of varying geometries.

In the illustrated embodiment, the end surface 118 of the plug 114 is planar. In other embodiments, the end surface 118 may be conical or frusto-conical, for example. In yet another embodiment, the end surface 118 may be shaped as a pyramid. In the illustrated embodiment, the anvil 26 extends at least partially within the first through hole 86. Specifically, the end surface 118 of the plug 114 is positioned at the transition between the first portion 94 and the second portion 102 of the first through hole 86. In other embodiments, the anvil 26 (either the plug 114 or the shaft portion 130) may extend into the first portion 94 of the through hole 86. In other embodiments, the anvil 26 may be spaced from the first through hole 86.

With continued reference to FIG. 6A. a planar ring seal 134 and an O-ring seal 138 are positioned between the anvil 26 and the end cap 46. In the illustrated embodiment, the seals 134, 138 are positioned within a recess 142 formed in the end cap 46 and are contained within the recess 142 by the anvil 26. The seals 134, 138 permit relative rotation of the anvil 26 with respect to the end cap 46 and the cylinder 34, while sealing the hydraulic fluid within the chamber 42.

Figure 6B:
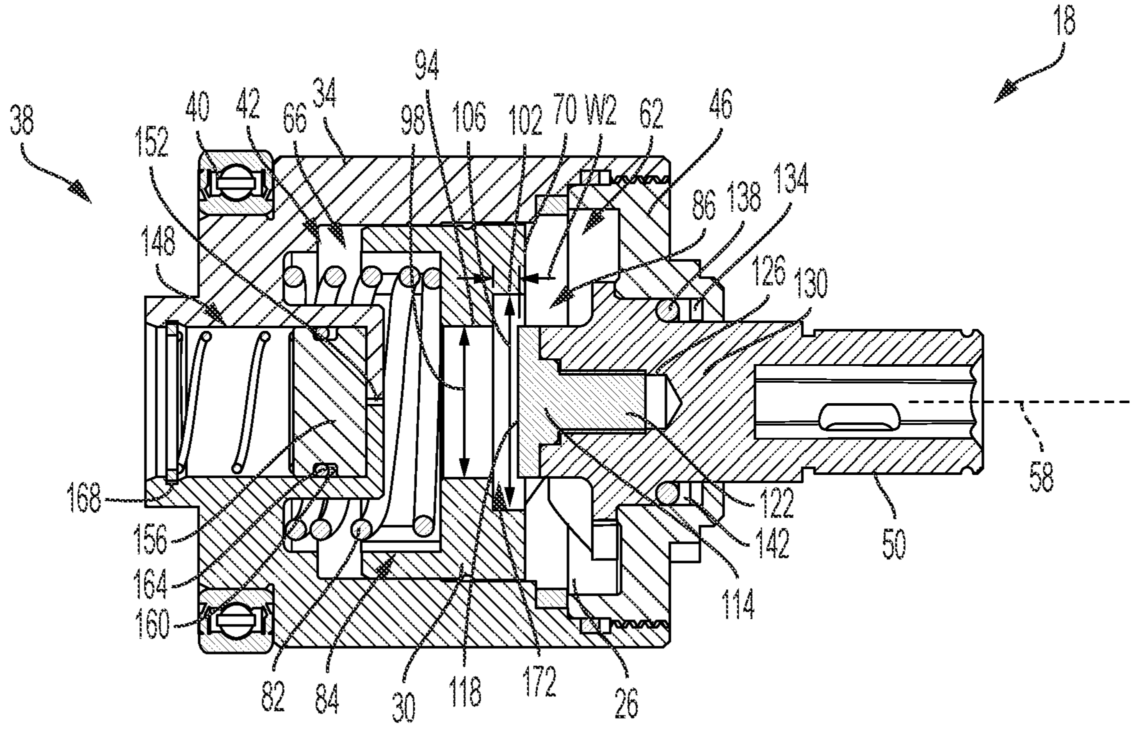
FIG. 6B is a cross-sectional view of the impulse assembly of FIG. 2, shown in a second configuration with the aperture in the hammer partially opened.
Figure 6C:
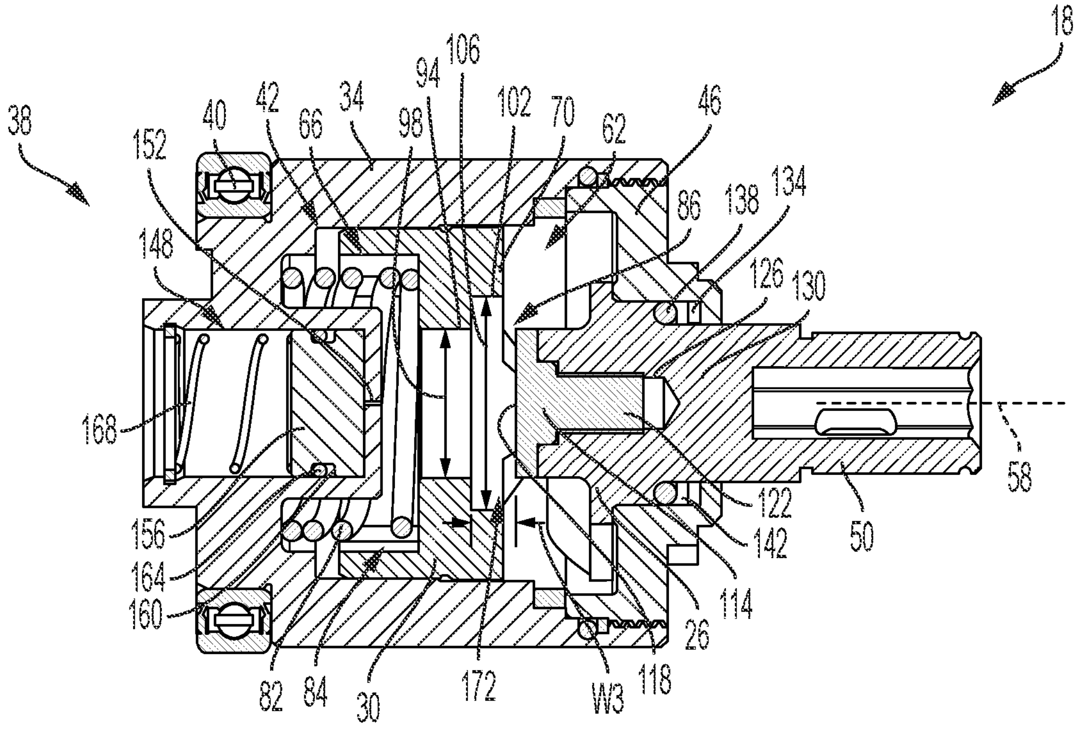
FIG. 6C is a cross-sectional view of the impulse assembly of FIG. 2, shown in a third configuration with the aperture in the hammer more open than in the second configuration.

With reference to FIGS. 6A-6C, the impulse tool 10 further includes an expansion chamber 148 defined in the cylinder 34. The expansion chamber 148 contains the hydraulic fluid and is in fluid communication with the chamber 42 by a passageway 152 (e.g., a pin hole) formed within the cylinder 34. A plug 156 is positioned within the expansion chamber 148 and is configured to translate within the expansion chamber 148 to vary a volume of the expansion chamber 148. In other words, the plug 156 moves with respect to the cylinder 34 to vary the volume of the expansion chamber 148. The size of the passageway 152 is minimized to restrict flow between the expansion chamber 148 and the chamber 42 and to negate the risk of large pressure developments over a short period of time, which may otherwise cause significant fluid flow into the expansion chamber 148. In some embodiments, the diameter of the passageway 152 is within a range between approximately 0.4 mm and approximately 0.6 mm. In further embodiments, the diameter of the passageway 152 is approximately 0.5 mm. In the illustrated embodiment, the plug 156 includes an annular groove 160 and an O-ring 164 positioned within the annular groove 160. The O-ring 164 seals the sliding interface between the plug 156 and the expansion chamber 148. A spring 168 biases the plug 156 toward the passageway 152. The plug 156 moves axially within the expansion chamber 148 to accommodate changes in temperature and/or pressure resulting in the expansion or contraction of the fluid within the sealed rotational impulse assembly 18. As such, a bladder or the like compressible member is not required in the cylinder 34 to accommodate pressure changes.

Figure 6D:
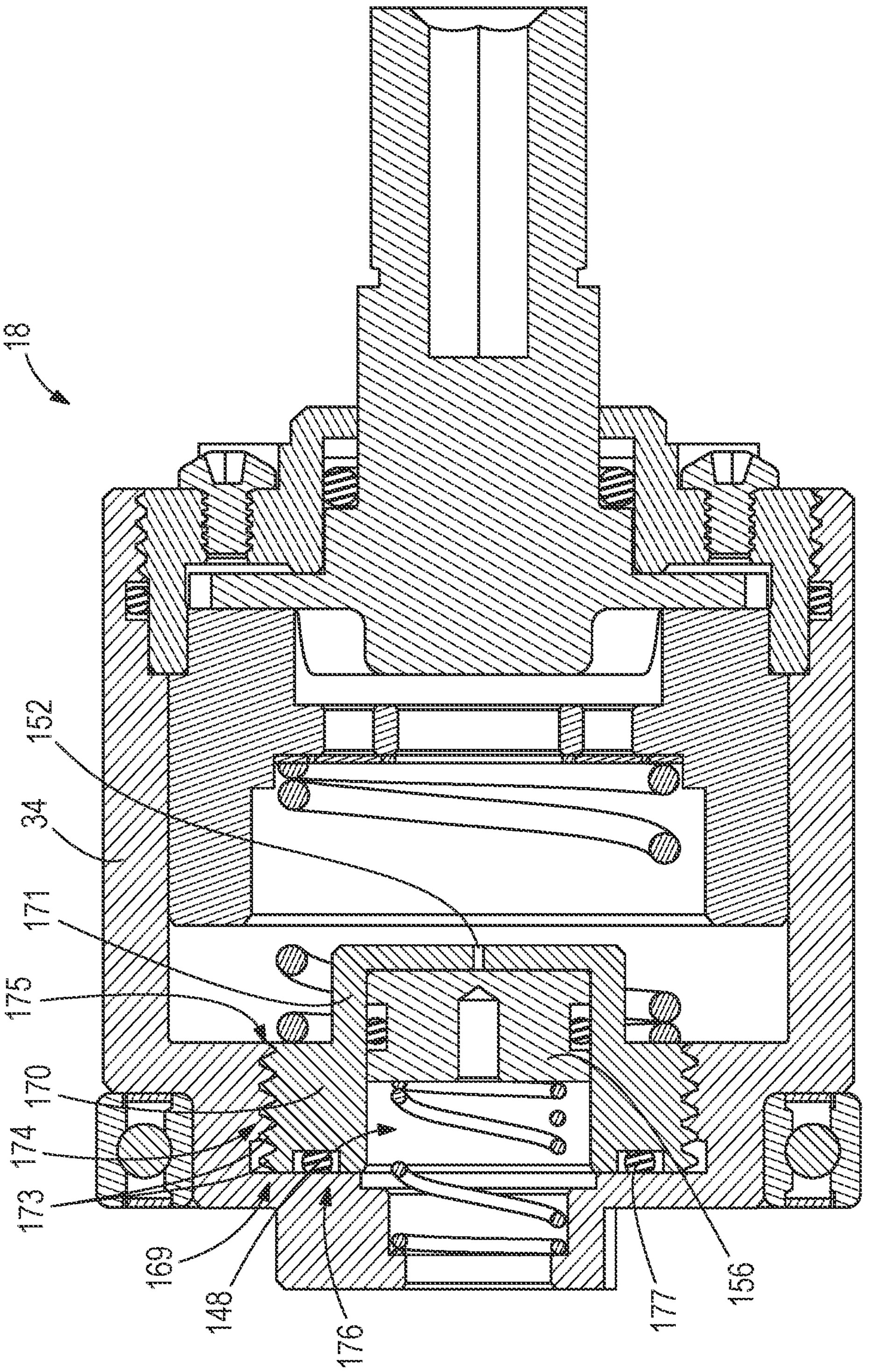
FIG. 6D is a cross-sectional view of an impulse assembly according to another embodiment.

With reference to FIG. 6D, in another embodiment, the expansion chamber 148 of the impulse assembly 18 is defined by an expansion piece 169 removably coupled with the cylinder 34. The plug 156 is positioned within and supported by the expansion piece 169 and is configured to translate within the expansion piece 169 to vary the volume of the expansion chamber 148. The expansion piece 169 includes a main body 170 and an expansion piece protrusion 171. The main body 170 and the protrusion 171 are cylindrical in shape. In the illustrated embodiment, the hammer spring 82 is at least partially received and supported by the protrusion 171. The passageway 152 is also formed in the expansion piece 169 in the illustrated embodiment.

With continued reference to FIG. 6D, the main body 170 includes external threads 173 configured to engage corresponding internal threads 174 formed within an internal bore 175 of the cylinder 34. As such, the expansion piece 169 may be threadably coupled to the cylinder during assembly of the impulse assembly 18. The expansion piece 169 further includes an annular recess 176 and a second O-ring 177 positioned within the annular recess 176. The second O-ring 177 seals the interface between the expansion piece 169 and the cylinder 34.

During operation of the impulse driver 10, the hammer 30 and the cylinder 34 rotate together and the hammer lugs 74 rotationally impact the corresponding anvil lugs 78 to impart consecutive rotational impacts to the anvil 26 and the output shaft 50. When the anvil 26 stalls, the hammer lugs 74 ramp over and past the anvil lugs 78, causing the hammer 30 to translate away from the anvil 26 against the bias of the hammer spring 82. FIGS. 6A-6C illustrate step-wise operation of a hammer retraction phase. FIG. 6A illustrates the impulse assembly 18 when the hammer lugs 74 are in contact with the anvil lugs 78 just prior to the anvil 26 stalling. At this point, the contact area between hammer lugs 74 and the anvil lugs 78 is the largest. FIG. 6B illustrates the impulse assembly 18 when the hammer 30 begins to translate away from the anvil 26. As the hammer 30 translates away from the anvil 26, the contact area between the hammer lugs 74 and the anvil lugs 78 decreases. At the end of the retraction phase (FIG. 6C), the hammer spring 82 is compressed and the hammer lugs 74 have almost rotationally cleared the anvil lugs 78. The contact area between the hammer lugs 74 and the anvil lugs 78 is reduced to a line contact just before the hammer lugs 74 clear the anvil lugs 78, and the hammer lugs 74 begin sliding over and past the anvil lugs 78.

As the hammer 30 moves away from the anvil 26, the hydraulic fluid in the chamber 42 on the first side 62 of the hammer 30 is at a low pressure while the hydraulic fluid in the chamber 42 on the second side 66 of the hammer 30 is at a high pressure. The hydraulic fluid flows from the second side 66 to the first side 62 by traveling through an annular opening 172 (FIG. 6B) at least partially defined between the anvil 26 and the first through hole 86. In the illustrated embodiment, the annular opening 172 is defined between the end surface 118 of the plug 114 and the transition between the first portion 94 and the second portion 102 of the first through hole 86. The size of the annular opening 172 is variable as the hammer 30 translates away from the anvil 26. As such, the resistance to the hydraulic fluid flowing through the first through hole 86 is variable. In the illustrated embodiment, the fluid resistance through the first through hole 86 decreases as the hammer 30 translates further away from the anvil 26.

With continued reference to FIGS. 6A-6C, the annular opening 172 is at least partially defined by a distance W1, W2, W3 defined between the anvil 26 and the first through hole 86. In the illustrated embodiment, the distance W1-W3 is measured between the end surface 118 of the plug 114 and the intersection of the first portion 94 and the second portion 102 of the first through hole 86. The distance W1-W3 between the anvil 26 and the first through hole 86 increases as the hammer lugs 74 slide along the anvil lugs 78 (i.e., as the hammer 30 translates along the axis 58 away from the anvil 26). With reference to FIG. 6A, the distance W1 is approximately zero. In other words, when the anvil 26 and hammer 30 are co-rotating, the anvil 26 is blocking the first through hole 86. With reference to FIG. 6B, the annular opening 172 has increased in size and the distance W2 is larger than the distance W1. With reference to FIG. 6C, the annular opening 172 has further increased in size with the distance W3 being larger than the distance W2 and the distance W1. As a result, the flow of the hydraulic fluid through the annular opening 172 and the first through hole 86 varies as the hammer 30 translates within the cylinder 34 along the axis 58 in proportion to the increasing distance W1, W2, W3. In other words, the rate of flow of hydraulic fluid through the first through hole 86 varies as the hammer 30 translates away from the anvil 26 as a result of the increase in flow area to the through hole 86. In the illustrated embodiment, the flow rate through the secondary through holes 90 remains approximately constant and does not vary as the hammer 30 translates within the cylinder 34. However, in other embodiments (See FIGS. 7-9), the flow rate through the secondary through holes 90 may vary as the hammer 30 translates within the cylinder 34.

The variable flow rate through the first through hole 86 provides for a reduction in wear on the interface between the hammer lugs 74 and the anvil lugs 78. At the beginning of the hammer retraction phase (FIG. 6A), the annular opening 172 between the anvil 26 and the hammer 30 is small or approximately zero, causing the hydraulic fluid in the chamber 42 at the second side 66 of the hammer 30 to exert a large reaction force to the hammer 30 in response to the applied force to the hammer 30 (from the relative sliding contact between the hammer lugs 74 and anvil lugs 78) causing it to axially retract. This allows the hammer 30 to transmit a relatively large torque to the anvil 26 while the hammer 30 is co-rotating with the anvil 26 (i.e., when the hammer lugs 74 are fully engaged with the anvil lugs 78 and the contact area between the lugs 74, 78 is the highest). The annular opening 172 then increases in size as the hammer 30 translates away from the anvil 26, which also reduces the contact area between the hammer lugs 74 and the anvil lugs 78. As a result of the annular opening 172 increasing in size, the resistance or reaction force provided by the hydraulic fluid remaining in the chamber 42 at the second side 66 of the hammer 30 is reduced, permitting the hammer 30 to more easily and more quickly axially retract away from the anvil 26 (i.e., the hydraulic fluid more easily flows through the progressively opening first through hole 86). Because there is less contact area between the hammer lugs 74 and the anvil lugs 78, the reduction in contact forces between the hammer 30 and the anvil 26 prevents damage from occurring to the lugs 74, 78. In other words, the torque and stress on the hammer lugs 74 and anvil lugs 78 decreases as the hammer 30 retracts away from the anvil 26 because of the increasing size of the annular opening 172. As a result, the wear on the hammer lugs 74 and the anvil lugs 78 is reduced.

Once the hammer lugs 74 rotationally clear the anvil lugs 78, the spring 82 biases the hammer 30 back towards the anvil 26 in a hammer return phase. Once the hammer 30 has axially returned to the anvil 26, the impulse assembly 18 is ready to begin another impact and hammer retraction phase.

In some embodiments, a valve may be positioned within the first through hole 86 and may progressively open as the hammer 30 retracts away from the anvil 26. Specifically, the valve can include a variable sized opening that increases as the hammer 30 translates away from the anvil 26. In this sense, the valve varies the flow of the hydraulic fluid through the first through hole 86 as the hammer 30 translates away from the anvil 26. As described in greater detail below, in some embodiments, a valve 184 may additionally or alternatively be provided to selectively permit and/or control fluid flow through the secondary through holes 90.

Figure 7:
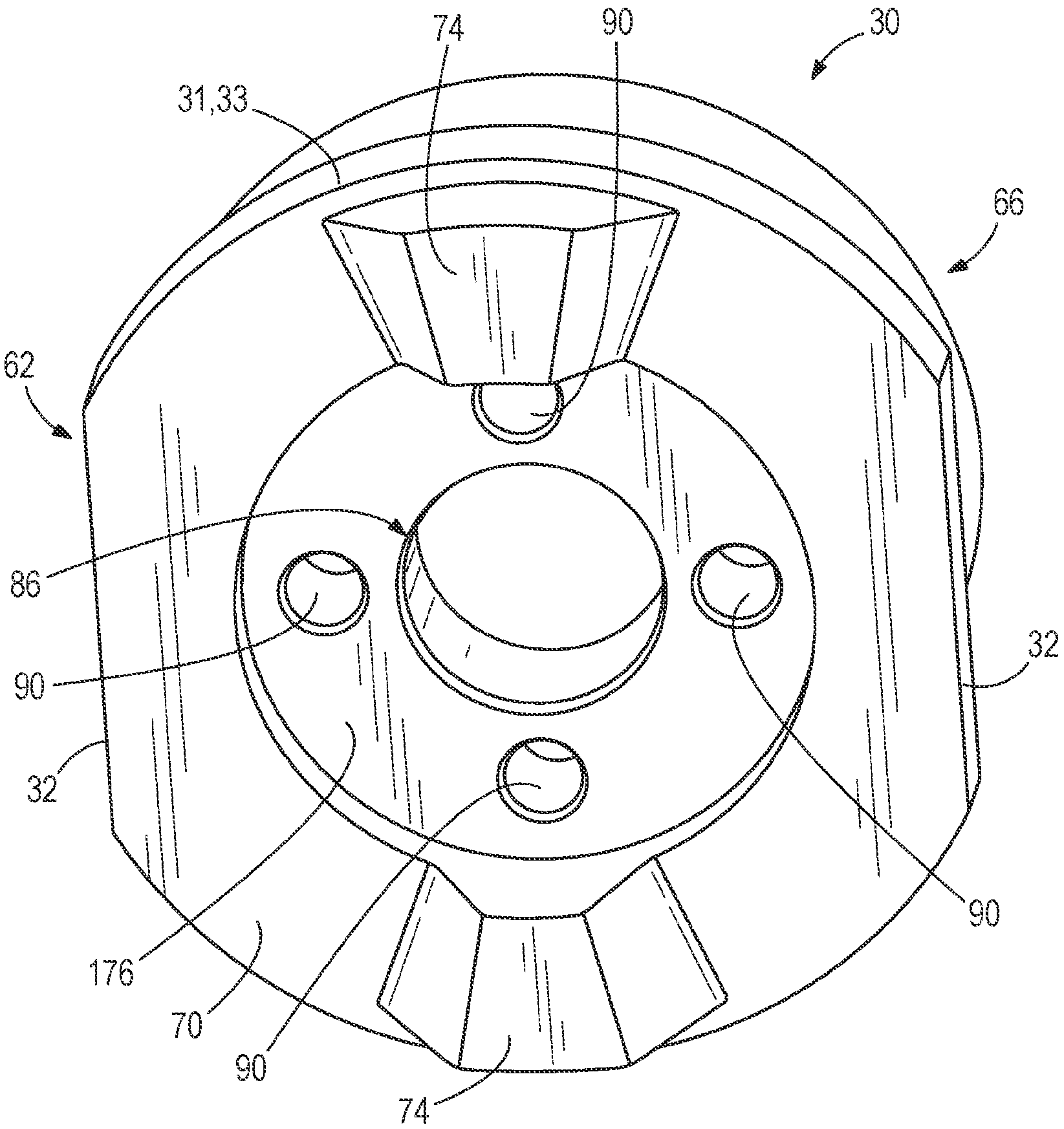
FIG. 7 is a perspective view of a hammer according to an embodiment of the present disclosure, which may be incorporated into the impulse assembly of FIG. 2 or FIG. 6D.
Figure 8:
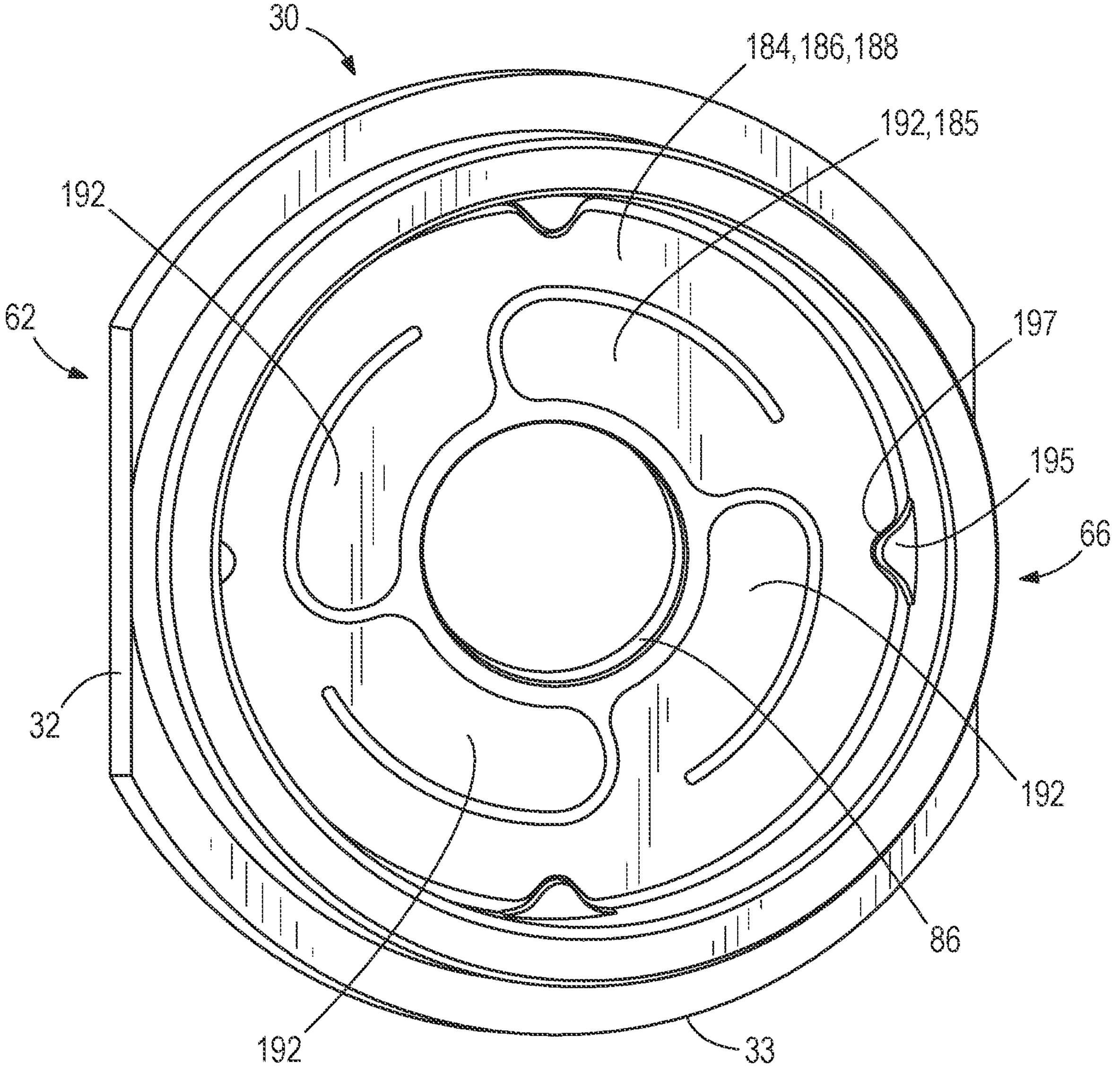
FIG. 8 is another perspective view of the hammer of FIG. 7, illustrating a valve.
Figure 9:
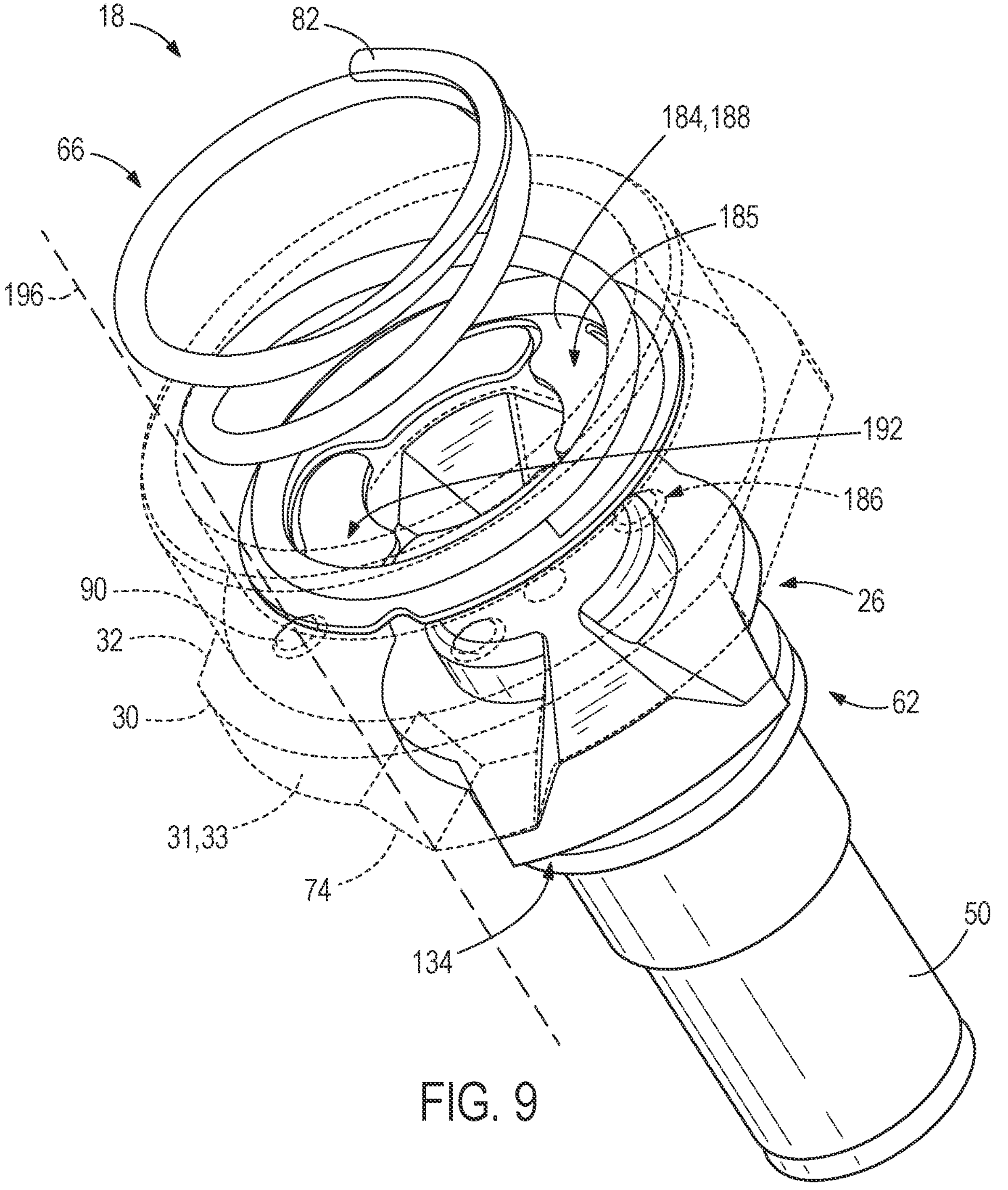
FIG. 9 is a perspective view of the impulse assembly of FIG. 2 including the hammer of FIG. 7, with some portions of the impulse assembly hidden for clarity.

With reference to FIGS. 7-9, in some embodiments, the surface 70 on the first side 62 of the hammer 30 may include a recessed portion 176. In the embodiment illustrated in FIGS. 7-9, the first through hole 86 and the secondary through holes 90 extend through the recessed portion 176. The hammer lugs 74 extend from the surface 70 radially outwardly of the recessed portion 176. In some embodiments, an inner surface of each hammer lug 74 may be contiguous with a boundary surface of the recessed portion 176.

With reference to FIGS. 8 and 9, in the illustrated embodiment of the hammer 30, the valve 184 is positioned within the recess 84 on the second side 66 of the hammer 30 such that the valve 184 surrounds the first through hole 86. The valve 184 controls the flow of the hydraulic fluid through the secondary through holes 90 as the hammer 30 translates within the cylinder 34.

Referring to FIG. 9, the illustrated valve 184 includes a valve body 188 generally shaped as a flat disc having an inner portion 185 and an outer portion 186. The outer portion 186 is engaged by the hammer spring 82, such that the outer portion 186 is positioned between the hammer spring 82 and the hammer 30 and the spring force of the hammer spring 82 is transmitted to the hammer 30 through the valve body 188. The inner portion 185 includes a plurality of valve arms 192, which are configured to cover the secondary through holes 90. The outer portion 186 includes a plurality of notches 197, which receive corresponding projections 195 formed on the hammer 30 to properly locate the valve 184 during assembly and to prevent rotation of the valve 184 relative to the hammer 30 (FIG. 8). The outer portion 186 is substantially circular in shape. The valve arms 192 correspond with the circular shape of the outer portion 186. In other embodiments, the hammer 30 may include the notches 197, and the valve 184 may include the projections 195. In the illustrated embodiment, the hammer 30 includes four secondary through holes 90, and the valve 184 includes four valve arms 192. In other embodiments, different numbers of secondary through holes 90 and valve arms 192 may be provided.

The illustrated valve arms 192 are resiliently deformable relative to the outer portion 186 of the valve body 188 and function as one-way reed valves to permit the flow of the hydraulic fluid through the secondary through holes 90 in a first direction (e.g., a direction away from the anvil 26) and block the flow of the hydraulic fluid through the secondary through holes 90 in a second direction (e.g., a direction toward the anvil 26). Thus, as the hammer 30 translates away from the anvil 26, the hydraulic fluid biases the reed valve arms 192 against the second side 66 of the hammer 30 to cover or obstruct the secondary through holes 90. As the hammer 30 translates toward the anvil 26, the hydraulic fluid biases the reed valve arms 192 away from the secondary through holes 90, permitting the hydraulic fluid to flow through the secondary through holes 90.

Figure 10:
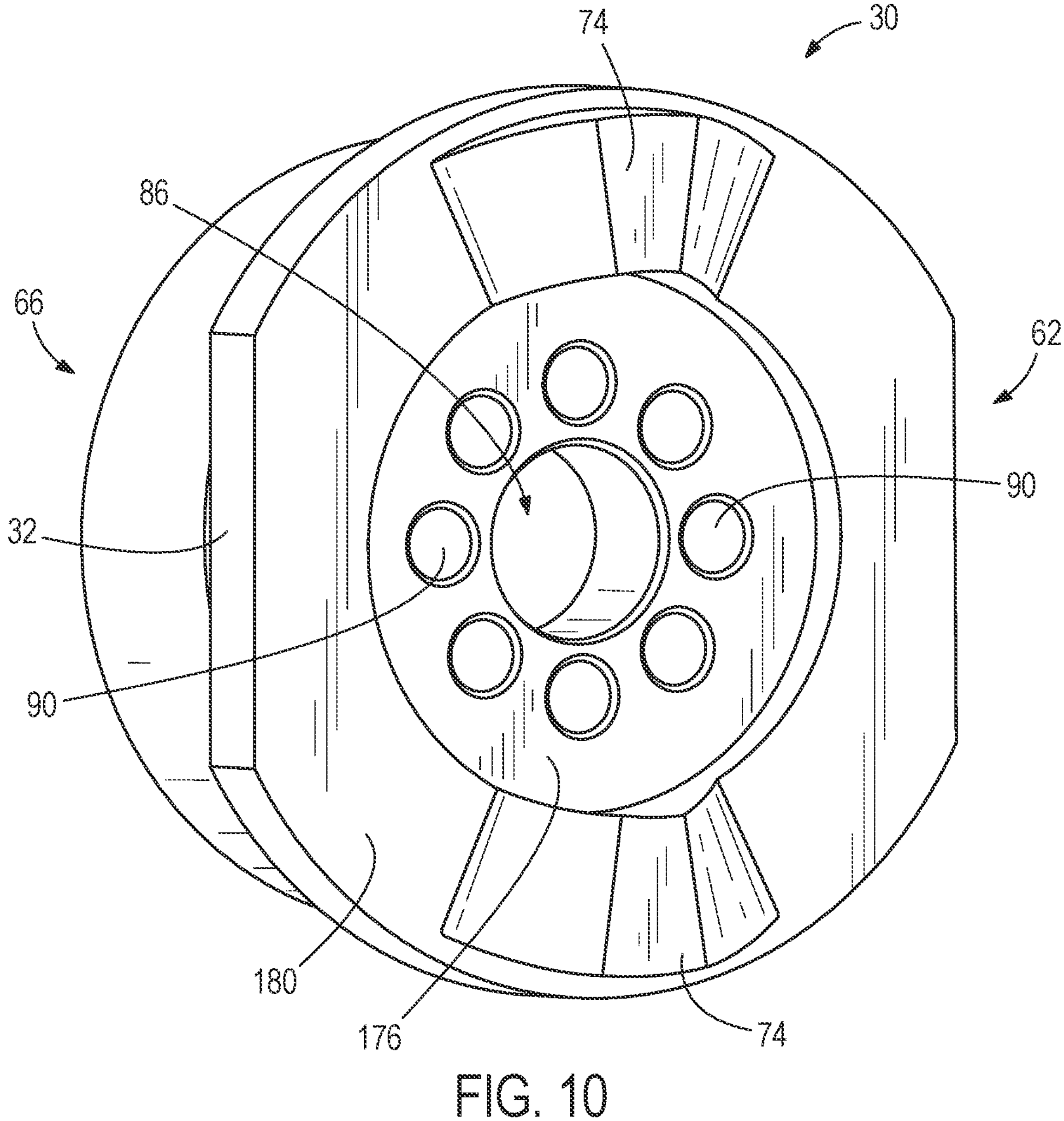
FIG. 10 is a perspective view of a hammer according to another embodiment of the present disclosure, which may be incorporated into the impulse assembly of FIG. 2 or FIG. 6D.
Figure 11:
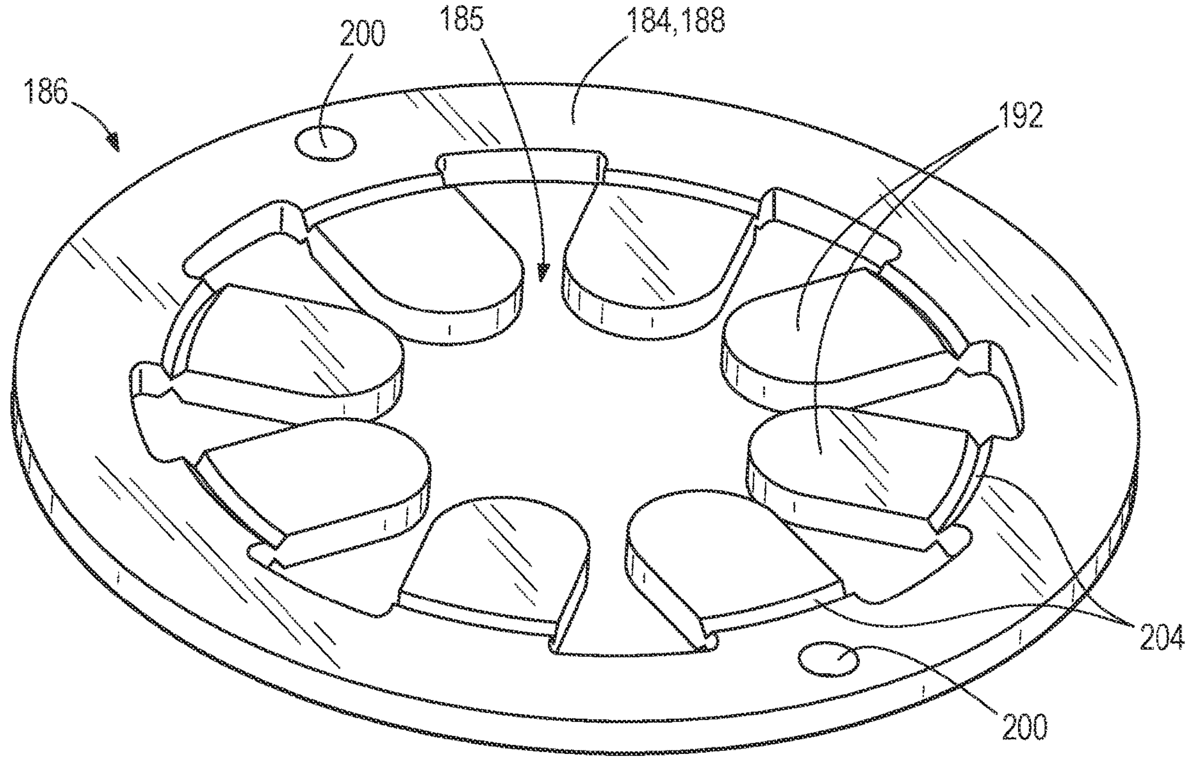
FIG. 11 is a perspective view of a valve that may be coupled to the hammer of FIG. 10.

Referring to FIGS. 10 and 11, in another embodiment, the outer portion 186 of the illustrated valve 184 includes a plurality of locating holes 200, which may receive corresponding projections formed on the hammer 30 to properly locate the valve 184 during assembly and to prevent rotation of the valve 184 relative to the hammer 30. In other embodiments, the locating holes 200 may receive a fastener (e.g., bolts, nails, etc.).

In the illustrated embodiment, the hammer 30 includes a plurality (e.g., eight) secondary through holes 90, and the valve 184 includes a corresponding plurality (e.g., eight) valve arms 192. The valve arms 192 extend from the outer portion 186 in a radially inward direction. Each valve arm 192 includes a notch 204 configured to facilitate deformation of the valve arms 192 in response to the flow of the hydraulic fluid through the secondary through holes 90.

The valve 184 provides for an amplification of the impact of the variable flow rate through the first through hole 86, which provides for a reduction in wear on the interface between the hammer lugs 74 and the anvil lugs 78. At the beginning of the hammer retraction phase (FIG. 6A), the hydraulic fluid biases the valve 184 to block the flow of the hydraulic fluid through the secondary through holes 90. During this phase, the annular opening 172 between the anvil 26 and the hammer 30 is small or approximately zero, which is further amplified by the secondary through holes 90 being blocked by the valve 184. This causes the hydraulic fluid in the chamber 42 at the second side 66 of the hammer 30 to exert a larger reaction force to the hammer 30 in response to the applied force to the hammer 30 (from the relative sliding contact between the hammer lugs 74 and anvil lugs 78) causing the hammer 30 to axially retract. This further allows the hammer 30 to transmit a relatively large torque to the anvil 26 while the hammer 30 is co-rotating with the anvil 26. Once the hammer lugs 74 rotationally clear the anvil lugs 78, the spring 82 biases the hammer 30 back towards the anvil 26 in a hammer return phase. In this phase, the fluid path 196 defined by the secondary through holes 90 is no longer blocked by the valve 184. The valve 184 causes a greater pressure to be generated during the hammer retraction phase and a lower pressure to be generated during the hammer return phase. This allows the hammer 30 to maintain an appropriate timing during both phases.

In alternate embodiments, the valve 184 may be located on the first side 62 of the hammer 30. In such embodiments, the valve 184 would open the fluid path 196 defined by the secondary through holes 90 as the hammer 30 translates away from the anvil 26 and block the fluid path 196 as the hammer 30 translates toward the anvil 26. In yet other embodiments, other types of one-way valves may be incorporated to control fluid flow through the secondary through holes 90.

Various features and aspects of the invention are set forth in the following claims.

What is claimed is:

1. A power tool comprising:

a housing;

a motor positioned within the housing;

an impulse assembly coupled to the motor to receive torque therefrom, the impulse assembly including a cylinder at least partially forming a chamber containing a hydraulic fluid, an anvil positioned at least partially within the chamber, and a hammer positioned at least partially within the chamber and engageable with the anvil for transferring rotational impacts to the anvil, the hammer including a through hole; and a valve configured to control flow of the hydraulic fluid through the through hole;

wherein the valve is configured to prevent the flow of the hydraulic fluid through the through hole in a first direction and to permit the flow of the hydraulic fluid through the through hole in a second direction; and wherein the hydraulic fluid flows in the first direction when the hammer moves away from the anvil, and wherein the hydraulic fluid flows in the second direction when the hammer moves toward the anvil.

2. The power tool of claim 1, wherein the valve includes an outer portion and an inner portion, the inner portion including a resilient arm movable relative to the outer portion to selectively cover and uncover the through hole.

3. The power tool of claim 2, wherein the hammer is biased toward the anvil by a spring, and wherein the outer portion of the valve is positioned between the spring and the hammer.

4. The power tool of claim 2, wherein the through hole is one of a plurality of through holes.

5. The power tool of claim 4, wherein the resilient arm is one of a plurality of resilient arms, each associated with a respective one of the plurality of through holes.

6. The power tool of claim 1, wherein the impulse assembly further comprises an expansion piece coupled to the cylinder, the expansion piece defining an expansion chamber in which a movable plug is received.

7. The power tool of claim 6, wherein the expansion piece includes a passageway extending between the chamber and the expansion chamber, and wherein the plug is biased toward the passageway.

8. The power tool of claim 6, wherein the plug is movable to vary a volume of the expansion chamber.

9. The power tool of claim 6, wherein the expansion piece is threadably coupled to the cylinder.

10. A power tool comprising:

a housing;

a motor positioned within the housing;

an impulse assembly coupled to the motor to receive torque therefrom, the impulse assembly including a chamber containing a hydraulic fluid, an anvil positioned at least partially within the chamber, and a hammer configured to reciprocate within the chamber, the hammer including a through hole; and a valve configured to control flow of the hydraulic fluid through the through hole;

wherein the valve is configured to prevent the flow of the hydraulic fluid through the through hole in a first direction and to permit the flow of the hydraulic fluid through the through hole in a second direction; and wherein the hydraulic fluid flows in the first direction when the hammer moves away from the anvil, and wherein the hydraulic fluid flows in the second direction when the hammer moves toward the anvil.

11. The power tool of claim 10, wherein the valve is configured to prevent the flow of the hydraulic fluid through the through hole in a first direction and to permit the flow of the hydraulic fluid through the through hole in a second direction.

12. The power tool of claim 10, wherein the valve includes an outer portion and an inner portion, the inner portion including a resilient arm movable relative to the outer portion to selectively cover and uncover the through hole.

13. The power tool of claim 12, wherein the anvil is configured to receive rotational impacts from the hammer, wherein the hammer is biased toward the anvil by a spring, and wherein the outer portion of the valve is positioned between the spring and the hammer.

14. The power tool of claim 12, wherein the through hole is one of a plurality of through holes, and wherein the resilient arm is one of a plurality of resilient arms, each associated with a respective one of the plurality of through holes.

15. The power tool of claim 10, further comprising an expansion chamber in which a movable plug is received, wherein the plug is movable to vary a volume of the expansion chamber, and wherein the expansion chamber is in fluid communication with the chamber via a passageway.

16. A power tool comprising:

a housing;

a motor positioned within the housing;

an impulse assembly coupled to the motor to receive torque therefrom, the impulse assembly including a cylinder at least partially forming a chamber containing a hydraulic fluid, an expansion piece coupled to the cylinder, the expansion piece defining an expansion chamber and a passageway fluidly communicating the chamber and the expansion chamber, a plug received within the expansion chamber, the plug movable to vary a volume of the expansion chamber, an anvil positioned at least partially within the chamber, and a hammer positioned at least partially within the chamber and engageable with the anvil for transferring rotational impacts to the anvil;

wherein the expansion piece is threadably coupled to the cylinder.

17. The power tool of claim 16, wherein the plug is biased toward the passageway.

* * * * *